United States Patent
Britten et al.

(10) Patent No.: US 10,835,994 B2
(45) Date of Patent: Nov. 17, 2020

(54) METHOD FOR JOINING TWO COMPONENTS IN THE REGION OF A JOINT ZONE BY MEANS OF AT LEAST ONE LASER BEAM, AND METHOD FOR GENERATING A CONTINUOUS JOINT SEAM

(71) Applicant: FRAUNHOFER-GESELLSCHAFT ZUR FÖRDERUNG DER ANGEWANDTEN FORSCHUNG E.V., Munich (DE)

(72) Inventors: Simon Britten, Aachen (DE); Benjamin Mehlmann, Aachen (DE); Alexander Olowinsky, Aachen (DE); Arnold Gillner, Roetgen (DE)

(73) Assignee: Fraunhofer-Gesellschaft Zur Foerderung Der Angewadten Forschung E.V., Munich (DE)

( * ) Notice: Subject to any disclaimer, the term of this patent is extended or adjusted under 35 U.S.C. 154(b) by 92 days.

(21) Appl. No.: 15/770,829

(22) PCT Filed: Oct. 31, 2016

(86) PCT No.: PCT/EP2016/001810
§ 371 (c)(1),
(2) Date: Apr. 25, 2018

(87) PCT Pub. No.: WO2017/076494
PCT Pub. Date: May 11, 2017

(65) Prior Publication Data
US 2018/0354074 A1 Dec. 13, 2018

(30) Foreign Application Priority Data
Nov. 2, 2015 (DE) .......... 10 2015 014 060

(51) Int. Cl.
*B23K 26/22* (2006.01)
*B23K 26/324* (2014.01)
(Continued)

(52) U.S. Cl.
CPC .......... *B23K 26/22* (2013.01); *B23K 26/0006* (2013.01); *B23K 26/0608* (2013.01);
(Continued)

(58) Field of Classification Search
CPC ............... B23K 26/22; B23K 26/0622; B23K 26/0006; B23K 26/0608; B23K 26/0626;
(Continued)

(56) References Cited

U.S. PATENT DOCUMENTS

| 5,755,447 A | 5/1998 | Hagiwara et al. | |
| 2002/0079296 A1* | 6/2002 | Dijken | B23K 26/22 219/121.64 |
| 2014/0048518 A1* | 2/2014 | Ogura | B23K 26/22 219/121.64 |

OTHER PUBLICATIONS

International Search Report of Corresponding International Application No. PCT/EP2016/001810, filed Oct. 31, 2016 (Previously Submitted).

(Continued)

*Primary Examiner* — Daniel McNally
(74) *Attorney, Agent, or Firm* — Robert W. Morris; Eckert Seamans Cherin & Mellott, LLC (57) ABSTRACT

A method is disclosed for joining two components (1, 2), a first component (I) and a second component (2), in the region of a joint zone by means of at least one laser beam. In a first phase, the first component (I) is melted, and a melt lens is formed in the first component (I) from the molten material (9). In a second phase, at least one pressure pulse is applied to the melt in the direction of the second component (2) until the melt lens is deflected into the joint gap as a result of the pressure pulse, bridges the joint gap, and (Continued)

comes into contact with the second component (2), and energy is transmitted to the second component (2) as a result of the melt lens coming into contact with the second component. A temperature curve results in the second component (2) as a result of the energy transmission such that the melting temperature is reached on the upper face of the second component (2), and a melt film is formed. The heat penetration depth is set such that a damaging temperature which damages the second component (2) is not exceeded at a specified depth. A method for generating a continuous joint seam is also disclosed.

11 Claims, 3 Drawing Sheets (51) Int. Cl.
*B23K 35/02* (2006.01)
*B23K 26/24* (2014.01)
*B23K 26/0622* (2014.01)
*B23K 26/00* (2014.01)
*B23K 26/06* (2014.01)
*B23K 26/073* (2006.01)
*B23K 26/08* (2014.01)
*B23K 26/26* (2014.01)

(52) U.S. Cl.
CPC ...... *B23K 26/0622* (2015.10); *B23K 26/0626* (2013.01); *B23K 26/073* (2013.01); *B23K 26/0869* (2013.01); *B23K 26/24* (2013.01); *B23K 26/26* (2013.01); *B23K 26/324* (2013.01); *B23K 35/0255* (2013.01)

(58) Field of Classification Search
CPC .. B23K 26/073; B23K 26/0869; B23K 26/24; B23K 26/26; B23K 26/324; B23K 35/0255
USPC .......................................... 156/272.2, 272.8
See application file for complete search history.

(56) References Cited

OTHER PUBLICATIONS

Durandus K. Dijken et al: "Laser Penetration Spike Welding: A Welding Tool Enabling Novel Process and Design Opportunities", Optical Sensing II, Bd. 4637, Jun. 17, 2002 (Jun. 17, 2002), Seite 555.
International Preliminary Report on Patentability of corresponding International Preliminary Application No. PCT/EP2016/001810, filed Oct. 31, 2016.
International Search Report of Corresponding International Application No. PCT/EP2016/001810, filed Oct. 31, 2016.

* cited by examiner

METHOD FOR JOINING TWO COMPONENTS IN THE REGION OF A JOINT ZONE BY MEANS OF AT LEAST ONE LASER BEAM, AND METHOD FOR GENERATING A CONTINUOUS JOINT SEAM

BACKGROUND OF THE INVENTION

The present invention relates to a method for joining two components in the region of a joint zone by means of at least one laser beam, and a method for generating a continuous joint seam.

Various methods are known that are used for joining two components.

Where the term "joining" is used in these documents, it refers to the joining of two components in the region of a joint zone in which the two components are joined together by fusion.

Various methods for joining components are used in the prior art.

In conventional laser beam welding, both joining partners are brought into the closest possible contact with each other. Ideally, there is no gap between the two components. Often, however, a gap occurs due to component inaccuracies that must be bridged by the welding process. In the conventional laser beam welding, both joining partners are locally melted by the laser beam by heating the first joining partner by the laser beam and locally melting it such that the second joining partner is melted simultaneously by thermal conduction. In deep welding, the second component is melted by the laser beam penetrating through a vapor capillary in the first component and thus the laser radiation impinging directly on the second component. In conventional laser beam welding, the size of the melting region in both components is determined by the continuous supply of laser energy.

In laser spike welding, thin metal sheets are welded together in an overlap joint arrangement. The material required to generate the welded joint comes exclusively from the upper joining partner, so that no additional material is required. The method enables gap bridging between the joining partners for distances up to 100% of the material thickness of the upper joining partner. This method intends to prevent spatter and contamination during the welding process of steel structures while simultaneously increasing the gap tolerance between the joining partners. The process takes place in two phases. The preheating phase is used to melt the material in the upper joining partner. To obtain a stable melt lens, the pulse power is selected so that the process threshold for deep welding is not exceeded. In this way, the material melts through to the underside of the upper joining partner and the additional energy induced in the spike phase is fully available for the material deflection. The spike phase is initiated by a temporary power increase following the preheating phase and is used to deflect the molten material in the direction of the lower joining partner. The increase in temperature until evaporation is carried out by increasing the power within a laser pulse with a constant focus diameter. The boiling temperature on the surface of the melt bath is exceeded and the material evaporates. The recoil of the steam particles accelerated out of the melt generates a pressure on the melt bath surface.

Another known method is laser droplet welding (LDW), which is a non-contact welding method using a filler material supplied to the process in the form of a wire. This method is used for joining electronic components using solder balls that are melted off the wire (fillet weld). The corresponding device consists of an automated wire feeding system and a laser system for providing the process radiation. The welding wire is fed vertically to facilitate dripping of the melt. To ensure a homogeneous heating of the welding wire, the energy is introduced by three laser beams focused on the wire and offset by 120° from each other. An alternative arrangement with the laser beam from above and lateral wire feed enables preheating of the substrate by means of defocused laser radiation. A variation of the LDW method described above is the so-called laser droplet brazing, in which a metallic preform is pre-positioned in a nozzle, melted with a laser beam and blown out towards the workpiece by means of nitrogen gas pressure.

Another known method, laser impact welding (LIW), is used for joining solid metallic components in sheet form by laser-induced propulsion of the upper component onto the lower joining partner. This shock welding uses the effect that a solid bond is created by applying a high pressure to two clean surfaces; according to common hypothesis, this is a consequence of diffusion and recrystallization beyond the material boundaries of the joining partners. The melting point of the two materials is irrelevant.

One type of shock welding is impact welding, in which a light joining partner experiences a high acceleration and impacts its counterpart at a high speed. The resulting pressure is sufficient to weld the two joining partners together. Laser impact welding (LIW) is the term used when a plasma is generated with the aid of focused, electromagnetic waves to accelerate the lighter joining partner. The applied pressures are in the range of $10^9$ Pa.

Solder jet bumping is used to join micro-optical systems by means of solder balls (fillet weld) and, similar to Laser Droplet Brazing, is done with nitrogen blow-out of the solder melt.

The LIFT method (laser induced forward transfer) uses laser radiation to transfer material from a donor layer across a gap to a receiver layer. In this case, the donor layer is applied to a carrier layer, which has a high transmittance for the wavelength of the processing laser. To transfer the donor material, the laser beam is focused through the carrier layer onto the donor layer interface. The energy introduced into the donor layer by irradiation causes it to heat up. As a result, the material at this location begins to melt. The melt front spreads in the direction of the free surface of the donor material until the pressure at the interface, due to material evaporation, is sufficient to release the donor material from the carrier layer and accelerate it towards the receiving layer.

SUMMARY OF THE INVENTION

The problem addressed by the present invention is that of providing a method for joining thicker metallic components to a sensitive component with a metallic layer, in particular a thin metallization (thinner lower joining layer), without causing damage to the lower component. In particular, the process shall be applicable for joining components with metallic layers on sensitive substrates. Furthermore, a method shall be specified with which the generation of a joining seam with the corresponding advantages is possible.

Sensitive substrates are those which tend to crack due to a high temperature gradient and the resulting stresses or which degrade due to high local temperatures.

In the first case, for example, these can be thin metal films on semiconductors and ceramics, in the second case metallic layers on plastics.

According to the method for joining two components in the area of one joint zone according to the invention, the following process steps are carried out using at least one laser beam.

First, a first component is thermally separated and positioned at a distance from a second component in the area of the joint zone, leaving a joint gap between the first and second components viewed in the direction of the thickness of the components. The width of the joint gap (in the direction of the thickness of the components) is determined by the fact that the melt generated in the first component is deflected onto the second component by a vapor pressure and must touch it. The movement capacity and behavior are influenced by the respective thickness of the component, the temperature and thus the viscosity in the melt and the surface tension in the melt in comparison to the unmelted state.

In a first phase, the at least one laser beam, viewed in the direction of the thickness of the components, is directed onto the first component on its surface facing away from the second component. The surface irradiated by the laser beam is called the irradiated surface $A_L$.

When the present documents speak of a direction of the laser beam, this direction refers to the beam direction, coming from a focusing optics, onto the component.

This laser beam melts the first component locally, at least according to the size of the joint zone, across its entire thickness. It is essential that the energy absorbed via the laser beam in the first component, designated $Q_{L,a}$, is selected so that the following condition is fulfilled:

$$Q_{L,a} = \int \dot{Q}_{L,a} dt = Q_{B1} + \int \dot{Q}_{cond1} dt + dH_{M1} + Q_{B2} + \int \dot{Q}_{cond2} dt + dH_{M2}$$

where
$Q_{L,a} = \int \dot{Q}_{L,a} dt$ energy absorbed in the first component
$Q_{B1} = \rho_1 \cdot A \cdot s_{B1} \cdot c_{p1} \cdot (T_{m1} - T_0)$ energy required to generate a local melt lens in the first component
where
  $\rho_1$=density of the first component,
  $A_1$=area of the melt lens projected in the direction of the laser beam
  $s_{B1}$=thickness of the first component,
  $c_{p1}$=thermal capacity of the first component,
  $T_{m1}$=melting temperature of the first component,
  $T_0$=ambient temperature
$\int \dot{Q}_{cond1} dt = Q_{cond1}$ conductive heat conduction losses in the first component
$dH_{M1}$ enthalpy for a material phase change in the first component
$Q_{B2} = \rho_2 \cdot A \cdot s_{B2} \cdot c_{p2} \cdot (T_{m2} - T_0)$ energy required to generate a local melt film in the second component
where
  $\rho_2$=density of the second component,
  $A_2$=area of the melt lens projected in the direction of the laser beam
  $s_{B2}$=thickness of the melt film in the second component
  $c_{p2}$=thermal capacity of the second component,
  $T_{m2}$=melting temperature of the second component,
  $T_0$=ambient temperature
$\int \dot{Q}_{cond2} dt = Q_{cond2}$ conductive heat conduction losses in the second component
$dH_{M2}$ enthalpy for a material phase change in the second component A melt lens is formed from the molten material in the first component.

Then, in a second phase, at least one pressure pulse is applied to the melt in the direction of the second component until the melt lens deflects into the joint gap due to the pressure pulse, bridges the joint gap and comes into contact with the second component. The contact of the melt lens with the second component causes an energy transfer to the second component, and the energy transfer results in such a temperature curve in the second component that its melting temperature is reached on the upper side of the second component.

An essential aspect is that the heat penetration depth into the second component is adjusted based on a contact time, designated as $t_{contakt}$, so that a damage temperature, called $T_{damage}$, damaging the second component, is not exceeded at a given depth of the second component.

The contact time $t_{contakt}$ is the time between a first contact of the melt lens with the second component and the solidification of the material melted in the melt lens.

The damage temperature $T_{damage}$ in the second component is defined as the temperature T at the depth $z_{krit,B2}$ of the second component viewed in the direction of its thickness, at which either the material under the metallization or under the metallic layer of the second component is damaged or the metallic layer on the upper side of the second component becomes detached from the underlying material of the second component.

The method according to the invention makes it possible to join thicker metallic components to more sensitive components with a thin metallization layer without causing damage in the second component, the lower component. The method according to the invention is particularly applicable to sensitive substrates for the second component.

In particular, the method according to the invention is used when joining a thicker, upper (viewed in the direction of the laser radiation) joining partner on a thinner, lower joining partner, and only a minimal energy deposition takes place in the lower component. This means that, due to a thermal decoupling of the upper component and the lower component, only such an energy input occurs in the lower component or only such an energy $Q_{L,a}$ is absorbed that a thin but sufficient melt film thickness is produced in the second component to join the two components materially. Therefore, the gap between the two components for realizing the thermal decoupling is essential. In the method according to the invention, melting of the second component takes place primarily from the energy contained in the melt of the first component. The laser beam power is reduced at the actual time of joining, which is regarded as the time when contact between the melt and the second component occurs. Another advantage is that the energy required for the joining process is reduced or minimized. In one process control, the energy input into the first component is controlled in such a way that the laser beam generates the melt lens and, if necessary, also exerts the pressure pulse on the melt, but does not penetrate through the melt lens. This ensures that the surface of the second component is not stressed by an energy input of the laser beam.

However, it is also provided that the energy input into the melt lens in the second phase is carried out in such a way that the laser beam penetrates through the first component without initially generating a melt in the second component, or at most melting the second component only very slightly, and that the temperature of the melt bridging the gap is not further increased. The pressure pulse on the melt lens that has formed in the first component is triggered in the second phase by material evaporation. This pressure pulse causes a transfer of the non-detaching melt lens from the first component in the direction of the second component, resulting in contact between the melt lens of the first component and the upper side of the second component facing the first component. The second component is then heated by the thermal energy stored in the melt located in the gap and melted on the surface so that the melts of both components join.

Such pressure pulses can be generated by the laser beam that causes the melt lens in the first component. However, it is also provided that such pressure pulses are exerted by a beam tool, for example an electron beam, a hollow chamber discharge, a gas pressure or fluid pressure, a mechanical pulse, an electric field, an electrostatic attraction, the application of a Bernoulli effect.

It is also provided to use certain modulation techniques to achieve a low-energy transfer of the melt from the first component across the gap to the second component. The process sequence is preferably adjusted such that penetration of the laser beam through the melt lens is avoided or at least minimized.

A temporal and/or local distribution of a material evaporation of the first component in the area of the melt lens is achieved by means of an adapted modulation technique in order to deflect it targeted over the gap. This temporal and/or spatial control of the evaporation by means of corresponding modulation techniques controls the temporal and spatial evaporation of the material of the first component and thus the pressure distribution in the melt and thus less energy is required and supplied to the joining partners than is required by methods of the prior art.

In contrast, a three-dimensional evaporation and pressure distribution leads to a strong localization of the evaporation area and to a penetration of the laser beam through the first component and/or to an additional energy input into the lower, second component, although the connection of the melt to the second component has already been achieved.

It is provided for the pressure pulse(s) applied in the second phase to be triggered by different modulation of the laser radiation.

Aside from a temporal power modulation of the laser beam and the laser beam focus, a local power modulation, a temporal focus modulation of the laser beam, or a combination of these, is provided as well.

For a temporal temperature modulation at the surface of the first component, the energy $Q_{L,a}$ of the second phase absorbed by the laser beam in the first component is temporally modulated by reducing or increasing the size of the irradiated surface with approximately the same laser power. Such a reduction is carried out such that the beam radius is modified by changing the distance between the focusing lens and the component or by changing the laser beam divergence.

It is also provided to change both the irradiated surface of the laser radiation on the first component and the irradiated laser power simultaneously. Here, the relationship $$P_L = \int \frac{\dot{Q}_{L,a}}{A_s} dt/t_P$$

is to be considered, where $P_L$ is the laser power, $A_s$ is the absorption coefficient of the first component for the laser radiation, and $t_P$ is the process time, i.e., the time that is the sum of heating and melting time of the first component, which forms the contact and heat transfer time to the second component.

Due to this correlation, the irradiated surface is changed such that firstly the region of the first component in which a melt forms and thus the energy content in this melt is adjusted and secondly the surface temperature for generating a vapor phase is controlled.

It is particularly preferred that the ratio of the laser power irradiated into the first component, which correlates to the energy $Q_{L,a}$ absorbed in the first component, to the irradiated surface $A_L$ (laser irradiated surface on the first component) be kept constant and a reduction of the irradiated area $A_L$ be carried out to generate a higher temperature in the center of the irradiated surface $A_L$ due to a reduction of the conductive losses in the first component.

The particular advantage of modifying the irradiated surface so that it is enlarged is the reduced energy requirement and a more controlled motion dynamics for the second phase, namely that the enlargement of the irradiated surface produces a lower surface tension gradient on the first component and thus a more stable melt lens.

A temporal power modulation can take place by a temporal modulation of the laser radiation with a power ramp of the energy introduced into the first component by the laser radiation (absorbed energy $Q_{L,a}$) adapted to the dynamics of the melt, with an unchanged irradiated surface $A_L$. Power ramp refers to a continuous increase or decrease or even a change in pulse/pause ratios.

A temporal modulation can be carried out by step-wise growing multiple power increases or power reductions of the laser radiation in the deflection phase of the melt lens in the gap. Additional intermediate intensities are obtained which lead to broadening of the melt lens in the melt phase, but which are adjusted so as to prevent the laser radiation from passing through the melt lens.

The at least one pressure pulse exerted on the melt lens to cause the melt to move towards the second component can be exerted in one embodiment of the method by a further laser beam superimposed on the at least one laser beam; the two laser beams, i.e. the at least one laser beam with which the melt lens is produced in the first component, and the laser beam that exerts the pressure pulse on the melt lens should have different intensities, focus diameters, pulse lengths (for example ms pulse, ns pulse) and/or wavelengths, so that an independent control of melt formation and vapor formation is made possible by this temporally superimposed intensity modulation of the two superimposed laser beams.

An increase in the melt film thickness of the melt lens can be achieved via a short-term power reduction, as the melt dynamics cause the vapor capillary to slosh over when the evaporation pressure is reduced. Such a power reduction is not carried out to excite an oscillation of the melt, but to increase the melt bath in the melting phase while simultaneously preventing the laser radiation from passing through the melt lens to the second component.

The further laser beam indicated above, or another beam source superimposed on the at least one laser beam, may be focused above the first workpiece in one embodiment of the method and/or have a wavelength having an increased absorption in an ambient atmosphere/plasma cloud above the first component. With this measure, an increase in absorption is achieved by the plasma cloud or by the foreign particles dissolved in the ambient atmosphere, thereby causing an increase in temperature and pressure above the workpiece in the deflection phase; by varying the laser power, pulse duration and pulse frequency, the laser beam can be adjusted to avoid the laser beam passing through the melt.

For local power modulation, it is advantageous to heat and melt the first component and thereby deflect the melt into the gap by a beam movement circling perpendicular to the beam axis of the at least one laser beam, for example an annular beam movement, a beam movement in the form of an 8 or a Lissajous-shaped beam movement with the at least one laser beam in the plane of the first component. This measure leads to a local temperature increase and thus to evaporation of the material of the first component.

This local power modulation also reduces the energy requirement in the melting phase of the first component and in the subsequent phase leads to a lower energy transfer to the second component, as a result of which the second component is only slightly stressed by an energy transfer. An adjustment of an intensity distribution of the laser beam in the area of the irradiated surface of the first component can be made from a Gaussian distribution of the radiation profile of the laser beam to a donut distribution of the beam profile or a top hat distribution of the beam profile. This change of the radiation profile, starting from the Gaussian distribution, causes a control of the local evaporation pressure and allows a change of the connection cross-section and the flank angle of the melt sloshing over to the second component. Here, a flank angle is the angle between the surface normal on the second component and the re-solidified melt between the two components. This flank angle should be within a range of 0-90° with a small angle between the surface of the second component and the re-solidified melt.

Joining can be carried out in an ambient atmosphere that is matched to the desired surface tension distribution of the melt lens in order to generate a flow of the melt in the center of the melt lens through the selected ambient atmosphere either to the center of the melt lens or to the edge of the melt lens, depending on the ambient gas. This results in an increase in the center temperature or a widening of the melt lens without any further change in power, which results in either a direct generation of vapor pressure or an increase in the connection cross-section.

It is also provided to increase the absorption of the first component by changing an ambient atmosphere and thus to increase the absorbed energy $Q_{L,a}$ in the first component. Depending on the material, oxygen or nitrogen is used for this purpose.

On the first component, a top layer transparent to the laser radiation can be applied to the side of the irradiated surface to form a pressure cavity between this transparent top layer and the first component. This pressure cavity causes the component to melt below the top layer and the vapor cannot expand when evaporating below the layer, thereby increasing the pressure.

The first component can be composed of two layers, an upper and a lower layer. Viewed in the direction of the beam axis of the laser beam, the upper layer onto which the laser beam is directed has an evaporation temperature that is lower than the evaporation temperature of the lower layer, but higher than the melting temperature of the lower layer, so that the upper layer already evaporates when the lower layer is still liquid. Such a material combination minimizes the energy input on the material side.

As has already been described, the moment at which the melt lens forming in the joint gap reaches the surface of the second component is a decisive moment. To determine this moment or to record it additionally, a measurement of the temperature or a variable correlating to the temperature of the first component can be made in the area of the melt lens. From a drop in temperature or a drop in the correlating variable, the moment of contact of the melt or the melt lens in the gap with the second component is derived, and at this time the energy input, i.e., further absorption of the energy $Q_{L,a}$ in the first component is reduced or terminated.

Such a cut-off time for the energy supply in the deflection phase can also be determined by a pyrometric measurement of the temperature on the top of the melt lens by detecting a sudden drop in temperature when the melt comes into contact with the lower component.

To achieve a reduction of the energy requirement during melting of the first component and an enlargement of the melt lens, the first component can be made by a circular beam movement of the laser beam at the beginning of the joining process in the first phase, wherein the circle diameter can lie in the range of 50-1000 µm.

The parameters for a circular diameter of the beam movement, for the feed speed of the laser beam along the circular path and for the number of circles are especially adjusted to the properties of the materials and the parameters of the laser beam.

A melt deflection by means of beam deflection in the form of a micro-ring (local power modulation) additionally reduces the energy requirement in the melting phase and leads to a lower energy transfer into the component in the subsequent phase. In the second phase, the diameter of the circulating beam movement of the laser beam can be reduced to a diameter of 0-100 µm, so that the heat dissipation is reduced by conduction with the result that the temperature in the middle of the melt lens increases, thereby generating the pressure pulse in the melt lens.

The detection of the melt movement can also be accomplished by measuring the absolute geometry of the upper side of the melt lens, i.e., of the surface of the melt lens center to the plane of the surface of the first component, and a vapor capillary formed in the first component and a passage of the laser beam through the melt, in order to adjust therefrom the deflection of the energy introduced into the first component via a control via the laser beam by controlling the irradiation duration, laser power and laser intensity. The range of absorbed energy $Q_{L,a}$ in dependence of the detected movement of the melt lens can be determined by a location-selective measuring technique by detecting a movement of the melt lens at the top side of the first component in the area of the irradiated surface.

For this purpose, for example, an interferometric position measurement of the upper surface of the melt lens is provided. By measuring the absolute position of the upper surface of the melt lens and the resulting vapor capillary, a passage of the laser beam through the melt and the deflection of the melt is detected, to which the laser power is controlled.

A change in resistance or capacitance between the first and second component can also be used to measure the deflection of the melt lens into the gap. The melt deflecting into the gap causes a change in resistance or capacitance between the components, so that bridging of the gap by the melt lens can be monitored due to this change.

Also provided is acoustic monitoring of the joining process and deriving at the moment at which the melt lens contacts the second component from exceeding the threshold value of an acoustic emission. A bang can occur, which is then used to reduce or end the energy input into the first component. Acoustic sensors can be used for this purpose to monitor the melt formation from the detected acoustic signals, since the acoustic signals change depending on the state of the vapor capillary in the first component and the progressing deflection of the melt towards the second component.

The method, as described above, is also suitable for producing a continuous joint seam by combining individual spot welds, which are produced according to the method described above, by means of overlap or strung together in a row, to form a continuous joint seam, by offsetting the laser beam step by step along the joint seam to be produced and carrying out such spot welding at each of the offset positions.

The method is particularly suitable for joining components in which the basic substrate of the second component consists of ceramic, silicon, germanium, plastic compounds/epoxy resin/FR4 printed circuit board material or glass types, in particular quartz glass, and on which a metallic layer is applied as the joining partner.

Additional details and features of the invention become apparent from the enclosed figures.

DESCRIPTION OF THE PREFERRED EMBODIMENT

The preferred embodiments of the present invention will now be described with reference to FIGS. 1-7 of the drawings. Identical elements in the various figures are designated with the same reference numerals.

Figure 1:
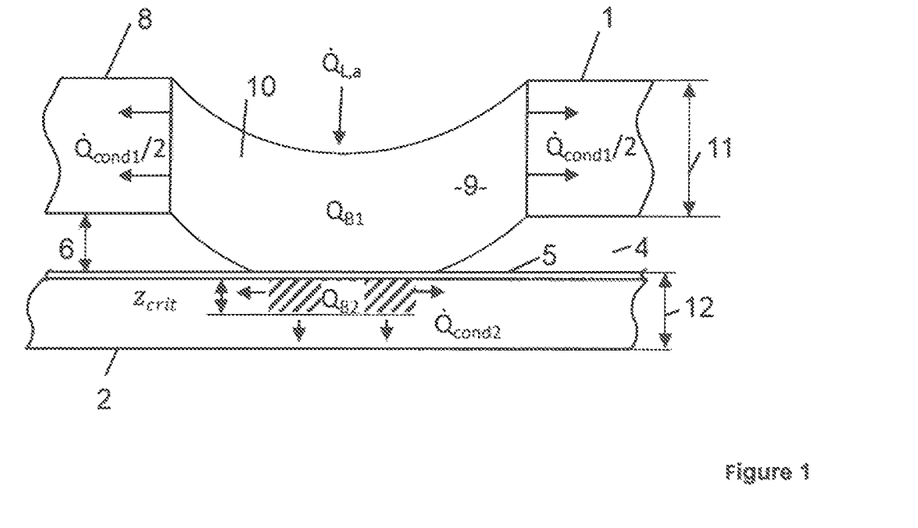
FIG. 1 shows a schematic representation to explain the method for joining two components according to the invention.

FIG. 1 schematically shows a joining process according to the method according to the invention for joining two components, an upper first component 1 and a lower second component 2. The index B1 is assigned to the upper component 1 in the sizes used, while the index B2 is assigned to the lower component 2.

At the beginning of the joining process, the two components 1, 2 are positioned thermally separated from each other at a distance so that a joint gap 4 remains between components 1, 2, in the direction of their thickness indicated by the direction arrow 3. The second component 2 uses a metallic layer 5 on its side facing the first component 1, which is to form a material connection with the melt of the first component. The width 6 of the joint gap 4 is dimensioned such that it has the smallest possible dimension at which a thermal separation of the joining partners, i.e. component 1 and component 2, is still achieved.

A laser beam 7 is then directed in the direction of the thickness of components 1, 2 onto surface 8 of the first component 1 facing away from the second component 2. The surface irradiated by the laser beam 7 or by more laser beams is referred to as irradiated surface $A_L$ and depends on the diameter of the laser beam 7 with which it impacts the surface 8 of the second component 2. The energy $Q_{L,a}$ introduced and absorbed in the first component 1 melts the first component 1 locally over its entire thickness. Due to the thermal separation of components 1, 2 via the joint gap 4, less energy is required overall in the melting phase of the upper component 1, since firstly no conductive heat conduction takes place from the first component 1 to the second component 2 and secondly the second component is not thermally influenced by the melting of the first component.

The size of the melting zone, viewed in the direction of surface 8 of the first component 1, should be at least the size of a joint zone to be produced.

The joint zone is the region of the two components 1, 2, in which the two components 1, 2 are joined together by fusion.

The energy $Q_{L,a}$ absorbed by the at least one laser beam in the first component 1 is set so that it fulfills the condition $$\text{absorbed energy} = Q_{L,a} = \int \dot{Q}_{L,a} dt = Q_{B1} + \int \dot{Q}_{kond1} dt + dH_{M1} + Q_{B2} + \int \dot{Q}_{kond2} dt + dH_{M2}$$

where $Q_{L,a} = \int \dot{Q}_{L,a} dt$ energy absorbed in the first component $Q_{B1} = \rho_1 \cdot A_1 \cdot s_{B1} \cdot c_{p1} \cdot (T_{m1} - T_0)$ energy required to generate a local melt lens in the first component where $\rho_1$=density of the first component, $A_1$=area of the melt lens projected in the direction of the laser beam $s_{B1}$=thickness of the first component, $c_{p1}$=thermal capacity of the first component, $T_{m1}$=melting temperature of the first component, $T_0$=ambient temperature $\int \dot{Q}_{cond2} dt = Q_{cond2}$ conductive heat conduction losses in the first component $dH_{M1}$ enthalpy for a material phase change in the first component $Q_{B2} = \rho_2 \cdot A_2 \cdot s_{B2} \cdot c_{p2} \cdot (T_{m2} - T_0)$ energy required to generate a local melt film in the second component where $\rho_2$=density of the second component, $A_2$=area of the melt lens projected in the direction of the laser beam $s_{B2}$=thickness of the melt film in the second component $c_{p2}$=thermal capacity of the second component, $T_{m2}$=melting temperature of the second component, $T_0$=ambient temperature $\int \dot{Q}_{cond2} dt = Q_{cond2}$ conductive heat conduction losses in the second component $dH_{M2}$ enthalpy for a material phase change in the second component This concludes the first phase of the method.

Now, in a second phase, at least one pressure pulse is applied to the melted material 9 or the melt lens 10 in the direction (direction arrow 3) of the second component 2 until the melt lens 10 deflects into the joint gap 4 as a result of the pressure pulse.

The joint gap 4 is then bridged by the melt lens 10 and comes into contact with the second component 2, as shown in FIG. 1. The contact of the melt lens 10 with the second component 2 causes an energy transfer to the second component 2. The energy $Q_{B2}$ transferred to the second component 2 and thus the energy transfer to the second component 2 results in such a temperature curve in the second component 2 that the melting temperature is reached on its upper side, which is covered by the metallic layer 5.

The melt film of the metallic layer 5 then forms a material bond with the melt lens 10, which solidifies when cooled and connects the two components.

The depth of heat penetration into the second component 2 is adjusted due to a contact time $t_{contakt}$, referred to as the time between a first contact of the melt lens 10 with the second component 2 and the solidification of the material 9 melted in the melt lens 10, so that a damage temperature $T_{damage}$ damaging the second component 2 is not exceeded at a predetermined depth of the second component 2. The conductive heat conduction losses $$\int \dot{Q}_{cond2} dt = Q_{cond2}$$

in the second component 2 are taken into account.

The damage temperature $T_{damage}$ in the second component 2 is defined as the temperature T at the depth $z_{crit}$ of the second component ($z_{crit,B2}$) viewed in the direction of its thickness 12, at which either the material under the metallic layer 5 of the second component 2 is damaged or the metallic layer 5 on the upper side of the second component 2 becomes detached from the underlying material 13 (base material).

The melting of the upper joining partner, i.e. the upper component 1, by means of the laser radiation is carried out with defined overheating of the melt in a range between the melting and evaporation temperature in coordination with the joining partners, components 1 and 2. A defined overheating means that the energy $Q_{L,a}$ absorbed in the first component 1 does not lead to complete evaporation of the melt lens, but is so large that after contact of the melt lens with the metal layer 10 of the second component and the associated energy dissipation into component 2, the melt lens does not solidify immediately, but solidifies only after a material connection of the two components has been made.

The deflection of the melt 9 or the melt lens 10 over the joint gap 4 to the lower component 2 by means of a transfer technique, for example a modulation of the laser radiation, is carried out under introduction of energy into the melt 9 such that the lower region of the melt lens 10 comes into contact with the upper side of the second component 2 and a melt transfer is achieved. The energy input and thus the increase in temperature at the interface between the melt lens 10 and the upper side of the second component 2 is reduced after deflection of the melt 9 or the melt lens 10 and their contact with the second component 2 such that sufficient mixing of the joining partners occurs without, however, exceeding the critical temperature at the interface between the metal layer on the second component 2 and the respective substrate material.

The method according to the invention utilizes defined melt overheating to heat the lower component 2 as a joining partner above the melting temperature $T_{m2}$. The required energy surplus in the melt lens is calculated as $E_m = \rho\, c_p V \Delta T$; $E_m$ is the energy required to produce a thin melting film in the metal layer of component 2, p is the density of the metal layer of component 2, $c_p$ is the specific heat of the metal layer of component 2, V is the volume of the melting film and $\Delta T$ is given by $\Delta T = (T_{m,\,lower,\,joining\,partner} + \text{temperature increase})$ to compensate for heat losses by heat conduction and melt enthalpy in the lower joining partner. The melt (molten material) 9 is overheated with adaptation to the required melt volume and the required energy $E_m$ for melting the lower metallization (metallic layer 5). For example, metallic layer 5 could be a 20 μm thick metallization on a temperature-sensitive substrate. According to the method, the lower joining partner, the second component 2, is melted only with the energy $Q_{B2}$ contained in the melt 9.

To minimize the energy input in the deflection phase, the process is controlled such that the melt deflection is the smallest deflection that still allows the melt to be connected to the lower component across the selected gap.

The connection of the melt to the lower component and thus the joining process is essentially only achieved by the energy present in the melt 9, so that the total energy input into the two components and the energy input into the lower, second component 2 is kept at a minimum value.

The modulation technique used according to the method according to the invention for deflecting the melt lens 10 into the joining gap 4 towards the second component is carried out such that the intensity of the laser radiation, designated as 12, in the deflection phase falls below a limit value, designated as $I_{limit\,value}$ ($I_2 < I_{limit\,value}$), which would otherwise lead to a significant penetration of the laser beam or of the laser radiation through the melt lens 10 and exceed the energy load limit of the lower component 2. The limit value $I_{limit\,value}$ depends, among other things, on the geometry and material of the joining partners 1, 2 and the modulation technique/beam guidance.

In a bonding phase, the deflected melt leads to wetting of the melt with the metal layer of the second component 2 and to a joint between the two components 1 and 2 across the joint gap 4. The external energy input via the laser radiation is terminated, as already mentioned above, with or shortly after the contact of the melt with the lower, second component 2, whereby the energy input into the lower component 2 primarily occurs only by the energy ($Q_{B2}$) contained in the melt 9.

Figure 2:
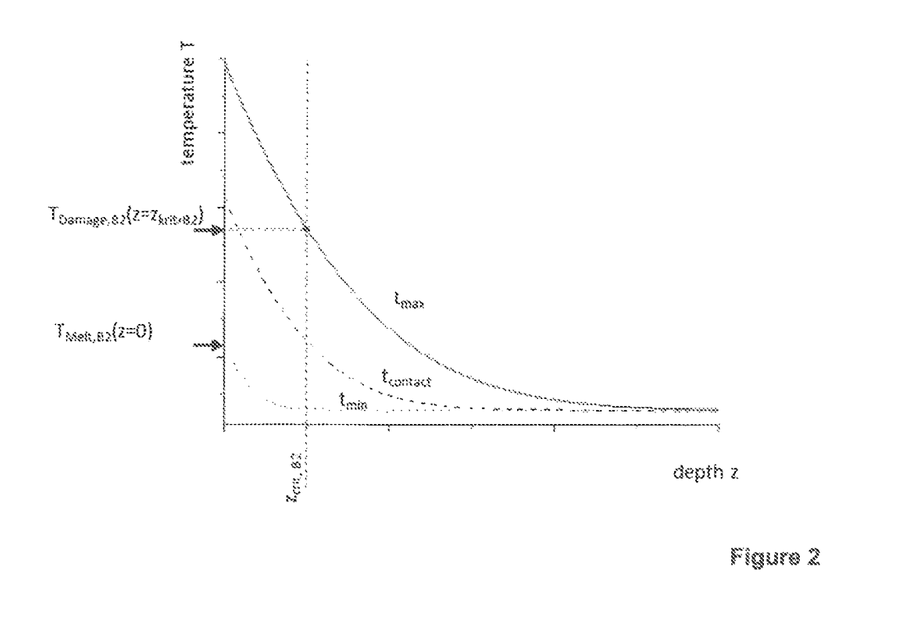
FIG. 2 shows a diagram presenting the temperature T as a function of the penetration depth z in the second component.

FIG. 2 shows a diagram illustrating the temperature T (in the second component 2) as a function of the penetration depth z in the second component 2. In this diagram, the curve, which is shown as a broken line and designated as $t_{contakt}$, indicates the temporal progression of the penetration depth z into the second component 2 from a first contact of the melt lens 10 with the second component 2. The other two curves for $t_{max}$ as a solid line and for $t_{min}$ as a dotted line indicate the minimum and maximum times to be observed for firstly reaching the melting temperature at the surface of the second component and secondly for reaching a critical damage temperature at the depth $z_{crit}$ in the second component.

The curves are derived from the one-dimensional heat equation $$T(z,t) - T_\infty = \frac{2 \cdot (q_F + I_{L,t})}{\rho \cdot c_P} \sqrt{\frac{t}{\kappa}}\, \mathrm{ierfc}\left(\frac{z}{\sqrt{4\kappa t}}\right)$$

where
 $T(z,t)$: Temperature curve in the second component at depth z at time t
 $T_{z,t}$: ambient temperature
 ierfc: integral error function complement
 $q_F$: heat input into the second component 2 where $q_F = \dot{Q}/A_{Kontakt} = \alpha \cdot (T_1 - T_2)$
 $I_{L,t}$: intensity of the laser radiation 7 transmitted through the melt 9
 α: heat transfer coefficient between the first and second components 1, 2
 $T_1$: temperature in the first component 1 at the time of melt 9 contact with the second component 2
 $T_2$: temperature in the second component 2 at the time of melt 9 contact with the second component 2
 t: time from a first contact of melt 9 with component 2
 $A_{contact}$: contact area between melt 9 and metal layer on component 2

κ: Thermal conductivity of the lower (second) component 2

ρ: density of the lower (second) component 2

$c_p$: heat capacity of the lower (second) component 2 z: depth in the component measured from the upper side of the second component 2.

On the temperature axis, the temperatures $T_{damage, B2}$ ($z=z_{crit, B2}$) and $T_{melt, B2}(z=0)$ are marked; the temperature $T_{damage, B2}(z=z_{crit,B2})$ indicates the temperature at which at the depth $z_{crit}$ ($z_{crit,B2}$), measured from the upper side of the second component 2, and which is indicated in FIG. 1, damage occurs while $T_{melt,B2}(z=0)$ indicates the melt temperature at the surface of the second component 2, i.e., at a depth z=0.

It can be seen that by setting the heat input qF and the contact time $t_{contakt}$ via the component depth even in the maximum case without conductive losses at Q(t)=const; $Q_{B2}(t=t_{contakt})=Q_{B2}(t=t_{solidification})$ also in the cooling phase at any time t the damage temperature $T_{damage}$ in the component depth $z_{krit,B2}$ of the second component 2, viewed in the direction of its thickness, is not exceeded. The graph in FIG. 2 also shows that the temperature gradient is set to the depth of component 2 in such a way that the critical damage temperature is not exceeded at any time after heating of the metal layer of component 2. The energy input into component 2 is distributed via conductive heat conduction such that the temperature in component 2 balances out without exceeding the critical temperature at the interface between metallization and substrate.

Figure 3:
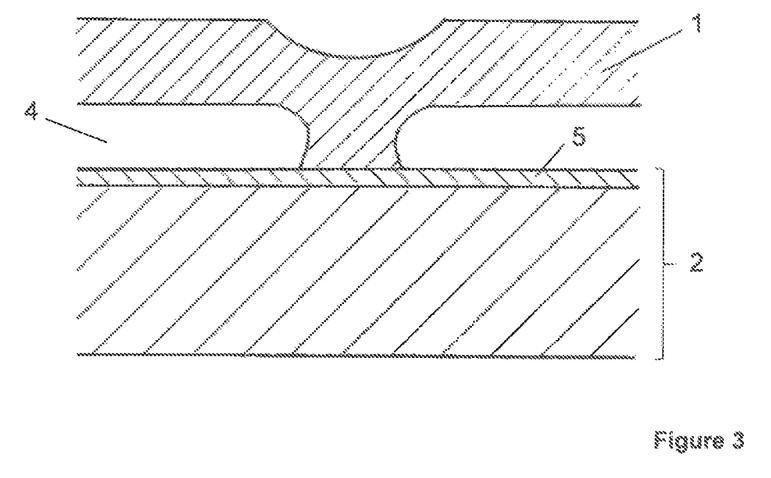
FIG. 3 shows a bonded joint between a 200 μm thick Cu substrate on a 35 μm thin metallization and an Si substrate.

FIG. 3 schematically shows a bonded joint over a joint gap 4, which was created between an upper, first component 1 and a lower, second component 2 according to the method according to the invention. The upper, first component 1 is a 200 μm thick Cu contact and the lower, second component 2 is a silicon substrate coated on its upper side with a 35 μm thick metallization of copper (metallic layer 5). This illustration shows that for thick-melt contacting of a thick terminal contact with a thin metallization on a temperature-sensitive substrate, the energy transfer is minimized by introducing the essential energy portion for melt formation in the terminal contact without a thermal contact for thin metallization. When the melt contacts the metallization, the hot melt melts the metal layer, but when it cools down, the energy introduced into the melt goes into the terminal contact and not into the temperature-sensitive component.

Figure 4:
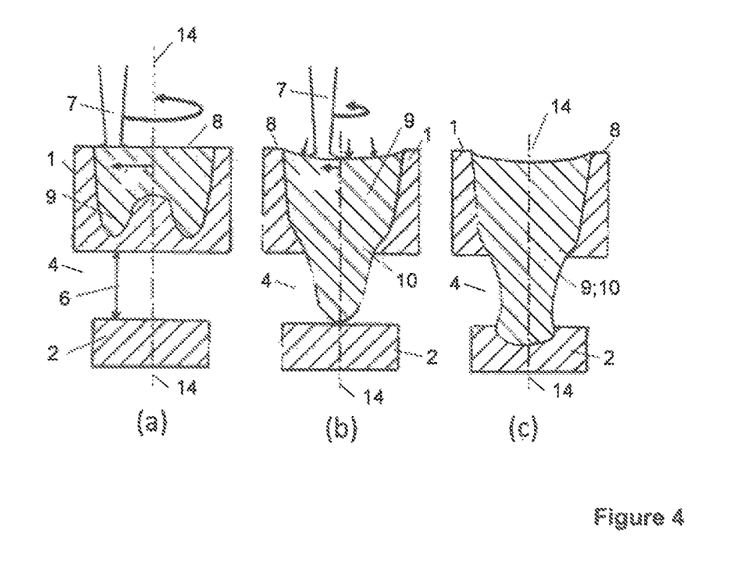
FIG. 4 shows three phases (a), (b) and (c) for joining two components using local power modulation.

FIG. 4 shows three phases (a), (b) and (c) for joining two components 1, 2 using local power modulation. In these figures, the metallic layer 5 on the upper side of the second component 2 is not shown. At the beginning of the joining process (phase (a)), the two components 1, 2 are spaced so that a joint gap 4 with a defined distance 6 (width of the joint gap) is formed between them. The laser beam 7 or the laser radiation used is guided over the surface 8 of the first component 1 in a circular motion with respect to an axis 14, so that the material of the first component 1 is melted in a circular shape. Accordingly, the zone of molten material 13 progresses faster in the outer area viewed perpendicular to axis 14 than in a central area near axis 14. With a progressing energy input via multiple laser rotations in accordance with the circular movement, the inner region is also melted via heat conduction, so that a homogeneous melting phase is produced. In phase (b), the radius of the circular movement of the laser beam 7 is then reduced in comparison to the radius in phase (a), so that the temperature in the middle of the melt is suddenly increased and the evaporation threshold is exceeded.

The melt deflection is achieved by evaporation due to an increase in temperature by a movement of the laser beam 7 in micro-rings and successive changes in the diameter of the circular movement (transition from phase (a) to phase (b)). In phase (a), preheating with a large circular diameter of the beam movement of, for example, 200 μm can be realized and then for phase (b), the deflection of the molten material 9 over the decreasing diameter of the circular movement with a diameter of 50 μm. Consequently, the diameter of the original circular motion is reduced by a factor of about 4. To prevent uncontrolled evaporation, the intensity of the laser radiation between phase (a) and phase (b) is kept constant or even reduced in the deflection phase (phase (a)) compared to the preheating phase (phase (b)). This achieves a homogeneous transition between melt formation and evaporation with controlled pressure formation, which transfers the melt into the joint gap.

When the molten material 9 reaches the underside of the first component 1, the molten material 9 bridges the joint gap 4 until the melt lens 10 strikes the top of the second component 2. This moment in time is measured using various methods as described above, so that the power of the laser beam is reduced or completely switched off at this time. This ensures that the molten material 9 only slightly melts the second component 2 and connects with this melt of the second component 2, so that after cooling a joint is formed, which is shown in phase (c) of FIG. 4.

Figure 5:
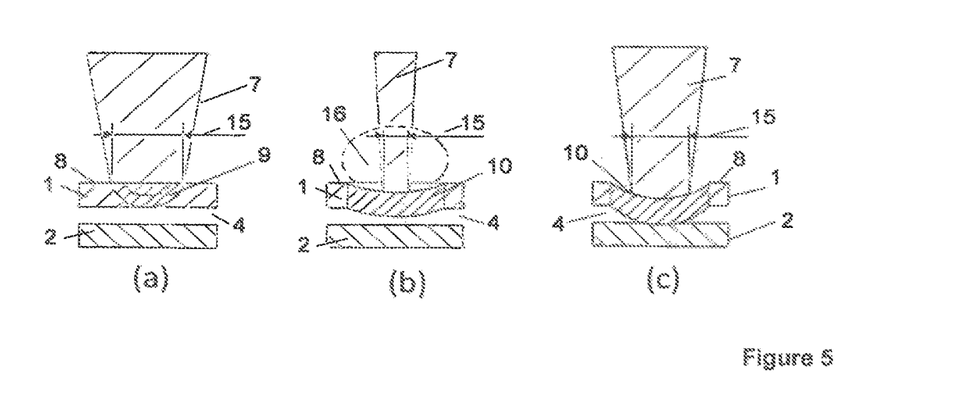
FIG. 5 shows three phases (a), (b) and (c) for joining two components using temporal focus modulation via a change in the irradiated surface.

FIG. 5 shows three phases (a), (b) and (c) for joining two components 1, 2 using temporal focus modulation of the laser radiation and via a change in the irradiated surface. Again, phase (a) is the warm-up phase, phase (b) is the deflection phase and phase (c) is the connection phase.

It is essential that with a temporal focus modulation the intensity of the laser radiation 7 is changed by means of dynamic change of the focus, for example via an electromagnetic telescope, at a constant power of the laser radiation.

In the preheating phase (a), component 1 is irradiated with a large beam diameter of the laser radiation 7, so that a melt lens 10 is formed that is determined according to the beam diameter and the heat conduction, the diameter 15 of the laser beam 7 being set so that no evaporation occurs at surface 8 and no capillary is formed either. Again, molten material 13 is formed in the first component 1 until this material reaches the underside of component 1.

In the subsequent deflection phase (b), the diameter 15 of the laser beam 7 is reduced in such a way that the intensity for reaching the evaporation temperature is reached and a vapor cloud 16 forms above component 1, which exerts a vapor pressure on the melt (melt lens 10). Alternatively, this can also be done by enlarging the laser beam 7 and the associated reduced lateral heat dissipation, so that an evaporation beam or lobe forms in the middle of the melt lens 10, which presses the melt in the direction of component 2.

In the connection phase (c), in which the melt lens 10 bridges the joint gap 4, the diameter 15 of the laser beam 7 is increased again in order to avoid the formation of a vapor capillary, which would otherwise influence component 2 thermally. Depending on the joint geometry and material, laser radiation is still briefly applied to the bonded joint until a homogeneous, molten zone is formed at the interface between the two components 1,2, which solidifies after the laser beam 7 is switched off. Such a temporal focus modulation by changing the irradiated surface of the laser radiation 7 into the first component 1 has the advantage that a constant power of the laser radiation 7 is used and the local distribution of the intensity with which the laser radiation 7 strikes the upper side of the first component 1 is carried out by dynamically changing the focus.

FIG. 6 shows again three phases (a), (b) and (c) for joining two components 1, 2 using temporal power modulation with a temperature increase and a pressure pulse caused by evaporation. In phase (a), the laser beam 7 is directed at the upper side 8 of the first component 1 so that molten material 9 is formed in the first component 1 according to the phase (a) described in FIG. 5 above. During the entire joining process, laser beam 7 remains unchanged with respect to its size.

Figure 6:
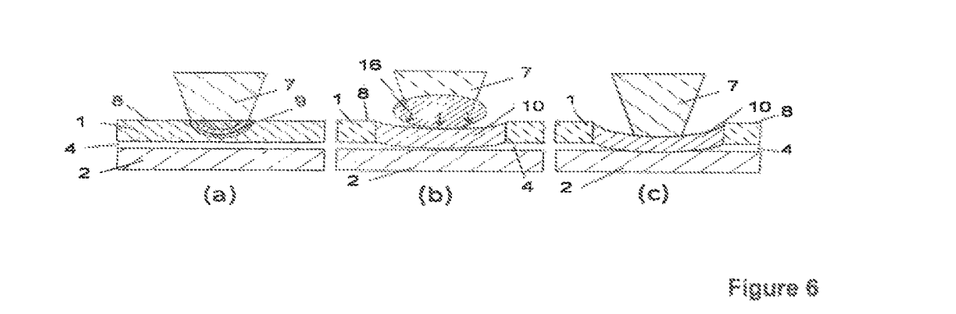
FIG. 6 shows three phases (a), (b) and (c) for joining two components using a temporal power modulation with a temperature increase and a pressure pulse caused by evaporation.

In phase (b), the power is increased to exceed the evaporation temperature so that the melt lens 10 is moved to component 2 via the vapor pressure that forms, thereby bridging the joint gap 4.

Figure 7:
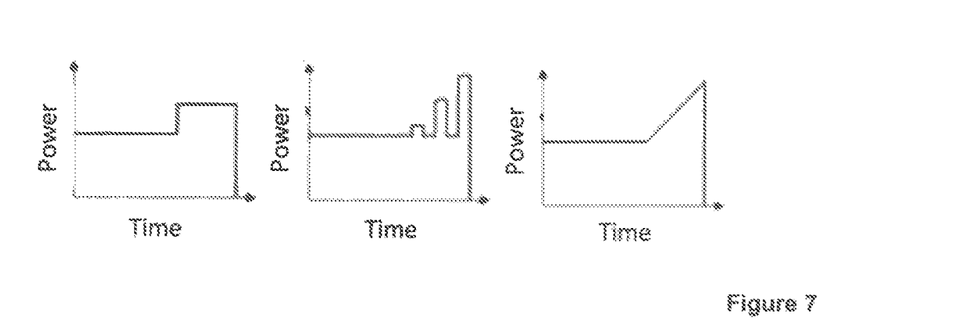
FIG. 7 shows three possible power profiles (a), (b) and (c) for a temporal power modulation of the laser radiation.

In phase (c), laser radiation 7 is briefly applied to the bonded joint until a homogeneous molten zone is formed at the interface between the two components 1, 2, which solidifies after the laser beam is switched off. FIG. 7 now shows three possible power profiles (a), (b) and (c) for temporal power modulation of the laser radiation, which is preferably used when the different heat dissipation conditions of component 2 have to be taken into account in order to generate a homogeneous melt in component 1. In these profiles, the power of the laser radiation is applied over time, i.e. the time of the joining process.

Profile (a) shows a rectangular profile with again a constant power in the preheating phase and a stepped increase in power for the connection phase, which is then kept constant in the connection phase.

Profile (b) shows a profile, which can be called a peak profile, with a constant power in the preheating phase and increasingly higher power peaks during the connection phase.

Profile (c) shows a ramp profile in which the power of the laser radiation is kept constant over the preheating phase (VWP) corresponding to phases (a) of FIGS. 5 and 6, while the power for the connection phase following the preheating phase is ramped up.

Of these profiles, profile (a) should be used if the geometry of component 1 is only slightly larger than the metallization of component 2 and the associated energy input into component 2 prevents the critical temperature in component 2 from being exceeded. In contrast, a peak profile (b) is to be preferred for cases in which a high heat dissipation in component 2 does not permit a homogeneous and sufficient formation of the melt lens. Here, a controlled energy deposition and controlled evaporation is possible by a fast power modulation with increasing peak power, without the laser beam passing through the melt lens of the first component. Ramp profile (c) is to be preferred if metrological instruments are used to control the process or if the heat dissipation in component 2 becomes so high after contact of the melt lens with component 2 that the melt solidifies too quickly, so that sufficient mixing and joining strength is not achieved. Here, the necessary energy is dosed by the additional energy deposition.

There has thus been shown and described a novel method for joining two components in the region of a joint zone by means of at least one laser beam, and method for generating a continuous joint seam, which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Method for joining two components having a thickness in a region of a joint zone defining free surfaces of the two components to be joined together by means of at least one laser beam comprising, the method comprising:
   positioning a first component in the region of the joint zone, thermally separated at a distance from a second component, viewed in a direction of the thickness of the components, forming a joint gap, the second component having a metallic layer on a side facing the first component,
   in a first phase, directing the at least one laser beam in the direction of the thickness of the components onto a surface of the first component facing away from the second component, wherein a surface irradiated by the at least one laser beam is referred to as an irradiated surface ($A_L$), and melting the first component locally, at least in accordance with a size of the joint zone, over its entire thickness, an energy ($Q_{L,a}$) absorbed by the laser beam in the first component being selected such that a condition $$\text{absorbed energy} = Q_{L,a} = \int \dot{Q}_{L,a} dt = Q_{B1} + \int \dot{Q}_{kond1} dt + dH_{M1} + Q_{B2} + \int \dot{Q}_{kond2} dt + dH_{M2}$$

is fulfilled, where
   $Q_{L,a} = \int \dot{Q}_{L,a} dt$ energy absorbed in the first component
   $Q_{B1} = \rho_1 \cdot A_1 \cdot s_{B1} \cdot c_{p1} \cdot (T_{m1} - T_0)$ energy required to generate a local melt lens in the first component
   where
   $\rho_1$=density of the first component,
   $A_1$=area of the melt lens projected in the direction of the laser beam
   $s_{B1}$=thickness of the first component,
   $c_{p1}$=thermal capacity of the first component,
   $T_{m1}$=melting temperature of the first component,
   $T_0$=ambient temperature
   $\int \dot{Q}_{cond2} dt = Q_{cond2}$ conductive heat conduction losses in the first component
   $dH_{M1}$ enthalpy for a material phase change in the first component
   $Q_{B2} = \rho_2 \cdot A_2 \cdot s_{B2} \cdot c_{p2} \cdot (T_{m2} - T_0)$ energy required to generate a local melt film in the second component
   where
   $\rho_2$=density of the second component,
   $A_2$=area of the melt lens projected in the direction of the laser beam
   $s_{B2}$=thickness of the melt film in the second component
   $c_{p2}$=thermal capacity of the second component,
   $T_{m2}$=melting temperature of the second component,
   $T_0$=ambient temperature
   $\int \dot{Q}_{cond2} dt = Q_{cond2}$ conductive heat conduction losses in the second component
   $dH_{M2}$ enthalpy for a material phase change in the second component
   whereby a melt lens is formed in the first component from molten material,
   then, in a second phase, applying at least one pressure pulse to the melt lens in a direction of the second component until the melt lens deflects into the joint gap due to the pressure pulse, bridges the joint gap and comes into contact with the second component, and energy is transferred to the second component by the contact of the melt lens with the second component, and such a temperature curve is generated by the energy transfer in the second component that on an upper side of the second component a melting temperature thereof is reached, a melt film is formed and a heat penetration depth, defined by $$d_w = \sqrt{4\kappa t_{contakt}}, \kappa = \text{thermal conductivity}$$

into the second component due to a contact time ($t_{contakt}$), referred to as a time between a first contact of the melt lens with the second component and solidification of material melted in the melt lens, is set such that a damage temperature ($T_{damage}$) damaging the second component is not exceeded at a predetermined depth of the second component, wherein the damage temperature ($T_{damage}$) in the second component is defined as a temperature T in a depth ($z_{crit,B2}$) of the second component viewed in a direction of the thickness of the second component, at which either damage to a material lying under the metallic layer of the second component occurs or a detachment of the metallic layer on the second component from an underlying material occurs.

2. Method as in claim 1, wherein the at least one pressure pulse is carried out by a further laser beam superimposed on the at least one laser beam, wherein the at least one laser beam and the further laser beam have different intensities, focus diameters, pulse lengths (ms pulse, ns pulse) and/or wavelengths.

3. Method as in claim 2, wherein the further laser beam is focused above the first workpiece.

4. Method as in claim 2, wherein the further laser beam has a wavelength which has an increased absorption in an ambient atmosphere/plasma cloud above the first component.

5. Method as in claim 1, wherein the pressure pulse(s) applied in the second phase is/are triggered by different modulation of laser radiation of the at least one laser beam.

6. Method as in claim 5, wherein a surface temperature generated by the at least one laser beam in the first component is temporally modulated in the second phase by increasing and decreasing a size of the irradiated surface with approximately a same laser power as a function of a process phase.

7. Method as in claim 1, wherein energy input into the melt lens in the second phase is carried out such that the laser beam passes through the first component without first generating a melt in the second component, and the temperature of the melt lens bridging the gap is not further increased, and wherein the second component is then heated by thermal energy stored in the melt located in the joint gap and melted on an upper side of the second component so that melts of both components connect, and that then a pressure puke on the melt lens in the first component is triggered by material evaporation.

8. Method as in claim 1, wherein joining is carried out in an ambient atmosphere which is matched to a desired surface tension distribution of the melt lens, wherein a flow of a melt in a center of the melt lens and in a direction of the second component is generated by the selected ambient atmosphere.

9. Method as in claim 1, wherein a measurement of the temperature or a variable correlating to the temperature of the first component is carried out in the region of the melt lens, and wherein a time of contact of the melt lens in the joint gap with the second component is derived from a drop in the temperature or a drop in the correlating variable and at this time a further absorption of the energy ($Q_{L,a}$) into the first component is reduced or ended.

10. Method as in claim 1, wherein a movement of the melt lens on the upper side of the first component is detected in the region of the irradiated surface and an extent of the absorbed energy ($Q_{L,a}$) is adjusted as a function of the detected movement of the melt lens.

11. Method for generating a continuous joint seam by combining spot welds produced by the method according to claim 1 by means of overlapping to form a continuous joint seam, by offsetting the laser beam step by step along the joint seam to be produced and spot welding at each of the offset positions.

* * * * *